US012359847B2

(12) United States Patent
Kearns et al.

(10) Patent No.: US 12,359,847 B2
(45) Date of Patent: Jul. 15, 2025

(54) SYSTEM FOR OPTIMIZING THERMAL ENERGY GENERATION FROM MULTIPLE ENERGY SOURCES

(71) Applicant: Antora Energy, Inc., Sunnyvale, CA (US)

(72) Inventors: Jordan Kearns, Cambridge, MA (US); Christian Fitch Briere, Cambridge, MA (US)

(73) Assignee: Antora Energy, Inc., Sunnyvale, CA (US)

( * ) Notice: Subject to any disclaimer, the term of this patent is extended or adjusted under 35 U.S.C. 154(b) by 0 days.

(21) Appl. No.: 18/476,869

(22) Filed: Sep. 28, 2023

(65) Prior Publication Data

US 2024/0019831 A1    Jan. 18, 2024

Related U.S. Application Data

(63) Continuation of application No. 17/707,041, filed on Mar. 29, 2022, now Pat. No. 11,809,153.
(Continued)

(51) Int. Cl.
F24H 15/164 (2022.01)
F01K 23/02 (2006.01)
(Continued)

(52) U.S. Cl.
CPC ........... *F24H 15/164* (2022.01); *F01K 23/02* (2013.01); *F24D 12/02* (2013.01); *F24D 19/1048* (2013.01); *G05B 19/042* (2013.01); *G05D 23/1923* (2013.01); *G06Q 50/06* (2013.01); *G05B 2219/2639* (2013.01);
(Continued)

(58) Field of Classification Search
CPC .............................. G05B 2219/2639
See application file for complete search history.

(56) References Cited

U.S. PATENT DOCUMENTS

| 4,896,500 | A | 1/1990 | Pavel et al. | |
|---|---|---|---|---|
| 6,487,508 | B1* | 11/2002 | Suzuki | H02J 3/008 700/300 |
| 2002/0082747 | A1* | 6/2002 | Kramer | H02J 3/004 700/295 |
| 2005/0274113 | A1 | 12/2005 | Sekiai et al. | |
| 2011/0302802 | A1 | 12/2011 | Wiseman et al. | |

(Continued)

FOREIGN PATENT DOCUMENTS

| CN | 202916655 U | 5/2013 |
|---|---|---|
| CN | 105222201 A | 1/2016 |

(Continued)

OTHER PUBLICATIONS

"A Conversation with Medley Thermal." YouTube, uploaded by Yale Center for Business and the Environment, Nov. 25, 2019, https://www/youtube.com/watch?v+TmbjJp4ekU Transcript and select Video Frames attached. (Year: 2019).

*Primary Examiner* — Laert Dounis
(74) *Attorney, Agent, or Firm* — Fredrikson & Byron, P.A.

(57) ABSTRACT

The present invention is directed to a system for generating thermal energy from different energy sources, having a combustion-powered thermal energy source, an electric-powered thermal energy source, a steam distribution system, and a controller. The combustion-powered thermal energy source and the electric-powered each having a plurality of sensors. The controller is configured to actuate either or both of the energy sources based at least in part on information received from one or more of the plurality of sensors.

20 Claims, 10 Drawing Sheets

Related U.S. Application Data

(60) Provisional application No. 63/167,684, filed on Mar. 30, 2021.

(51) Int. Cl.
*F24D 12/02* (2006.01)
*F24D 19/10* (2006.01)
*G05B 19/042* (2006.01)
*G05D 23/19* (2006.01)
*G06Q 50/06* (2024.01)

(52) U.S. Cl.
CPC ............... *Y02E 20/30* (2013.01); *Y02E 40/70* (2013.01); *Y02E 60/14* (2013.01); *Y02E 70/30* (2013.01); *Y04S 10/14* (2013.01); *Y04S 50/16* (2018.05)

(56) References Cited

U.S. PATENT DOCUMENTS

| | | | | |
|---|---|---|---|---|
| 2012/0197683 | A1* | 8/2012 | Marcus | G06Q 40/04 |
| | | | | 705/37 |
| 2013/0047595 | A1* | 2/2013 | Khajepour | F04B 27/067 |
| | | | | 418/5 |
| 2016/0338230 | A1* | 11/2016 | Kaplan | H05K 5/0213 |

FOREIGN PATENT DOCUMENTS

| | | | | |
|---|---|---|---|---|
| EP | 3225937 A1 * | 10/2017 | ............. | F25B 30/02 |
| EP | 3352371 A1 * | 7/2018 | ............. | C25B 3/25 |
| KR | 930018236 A | 9/1993 | | |
| KR | 20000018729 U | 10/2000 | | |
| KR | 100458676 B1 | 12/2004 | | |

* cited by examiner

SYSTEM FOR OPTIMIZING THERMAL ENERGY GENERATION FROM MULTIPLE ENERGY SOURCES

CROSS-REFERENCE TO RELATED APPLICATIONS

This application claims priority to U.S. patent application Ser. No. 17/707,041, filed Mar. 29, 2022 and titled "System for Optimizing Thermal Energy Generation from Multiple Energy Sources," which claims the benefit of U.S. Provisional Patent Application No. 63/167,684, filed on Mar. 30, 2021 and titled "System and Method for Optimizing Thermal Energy Generation from Multiple Energy Sources," the entire contents of both which are incorporated herein by reference in their entirety.

BACKGROUND OF THE INVENTION

Embodiments of the present invention are generally directed to the creation of thermal energy from multiple energy sources of different type. Thermal power generation systems are generally known, wherein a thermal fluid (e.g., steam, hot water, oil, etc.) may be created from a variety of heating systems. Generally, these heating systems consume the same sources of energy, but there are current embodiments where multiple different sources of energy such as the burning of various fossil fuels, are consumed. In traditional thermal generation systems, a skilled operator must use his or her judgment to determine the most cost-efficient energy source(s) to meet the demand of the thermal system at any given time. As energy systems grow more complex, however, the operator must consider more and more factors in this analysis.

Accordingly, there is a need for a computer-aided system and method to find the most cost-effective energy source(s) at any given time to meet the thermal energy demands.

BRIEF SUMMARY OF THE INVENTION

In one aspect, an embodiment of the present invention is directed to a system for generating thermal energy from different energy sources, having a combustion-powered thermal energy source with a water input having a water flow sensor, a water pressure sensor, and a water temperature sensor, a fuel input having a flow sensor, an exhaust output, and a thermal fluid output having a flow sensor, a pressure sensor, and a temperature sensor. The system further includes an electric-powered thermal energy source with a water input having a water flow sensor, a water pressure sensor, and a water temperature sensor, an electricity input having a power monitor, and a steam output having a steam flow sensor, a steam pressure sensor, and a steam temperature sensor. The system also includes a steam distribution system and a controller configured to actuate either or both of the energy sources based at least in part on information received from one or more of the sensors.

In another aspect, an embodiment of the present invention is directed to a system for generating thermal energy from a plurality of different energy sources, the system having a combustion-powered thermal energy source having at least one combustion heater, each combustion heater having a combustion-based thermal output capacity. The system further includes an electric-powered thermal energy source having at least one electric heater, each electric heater having an electric-based thermal output capacity. The system also includes a controller configured to calculate a cost of thermal energy and dispatch either or both of the combustion-powered thermal energy source and the electric-powered thermal energy source, the cost of thermal energy is calculated based upon at least one of: a forecast of future energy prices; a forecast of future energy demand; a carbon cost model; or a marginal cost of utilizing the combustion-powered thermal energy source or the electric-powered thermal energy source.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
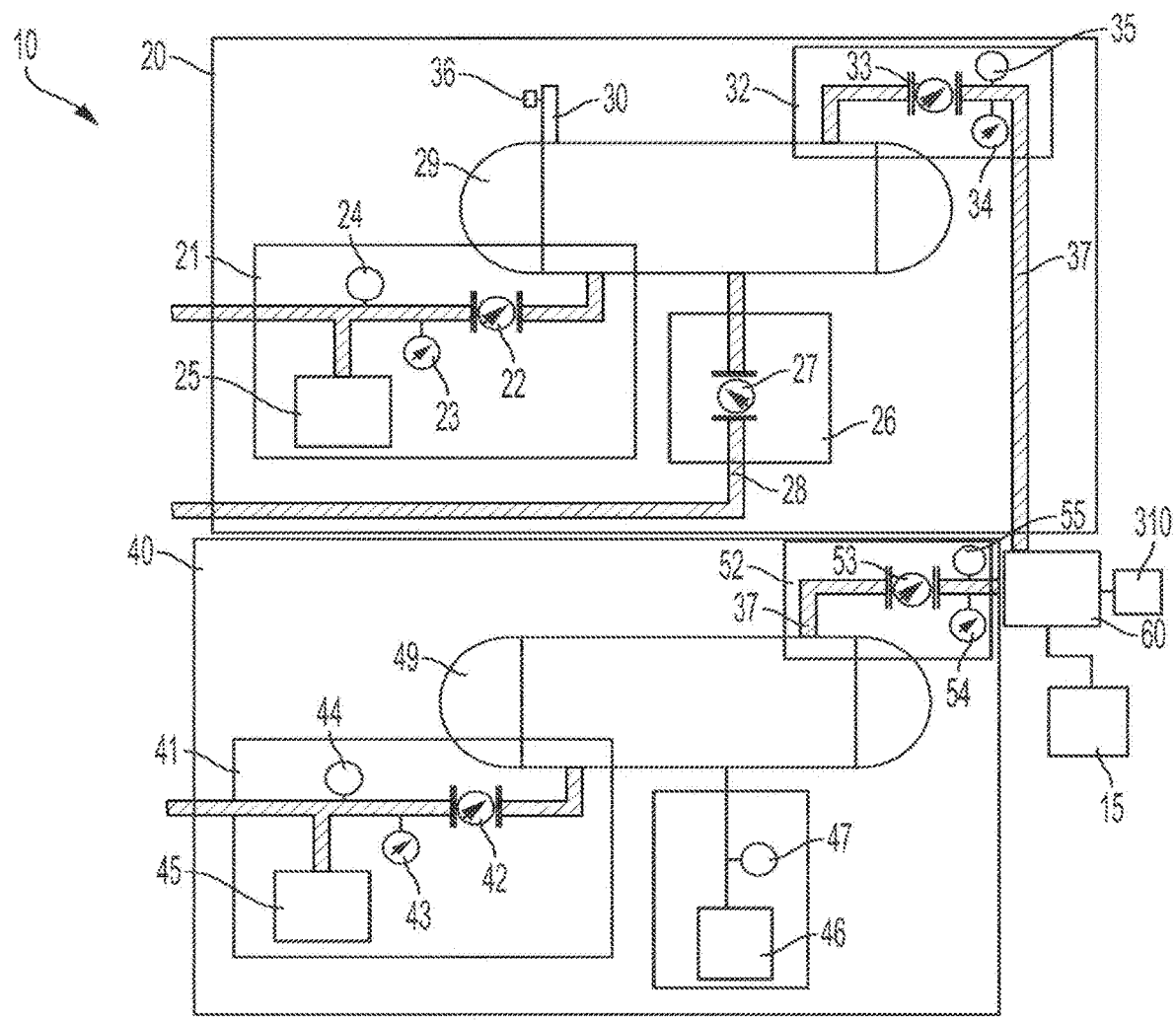
FIG. 1 is a block diagram of a thermal energy generation system having multiple sources, in accordance with one exemplary embodiment of the invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, one embodiment of the present invention is directed to a system 10 for generating thermal energy from a plurality of different energy sources. The system 10 of the first exemplary embodiment has a combustion-powered thermal energy source 20 having a thermal fluid input 21. The thermal fluid input 21 preferably has a thermal fluid flow sensor 22, a thermal fluid pressure sensor 23, a thermal fluid temperature sensor 24, and a makeup thermal fluid source 25. The combustion-powered thermal energy source 20 also preferably has a fuel input 26 having a fuel flow sensor 27, an exhaust output 30, and a first thermal fluid output 32. The fuel flow sensor 27 may also be referred to as a fuel flow meter and is preferably configured to monitor the amount of a fuel 28 that is consumed by the combustion-powered thermal energy source 20. The exhaust output 30 preferably includes a flue gas analyzer 36, but is not so limited. The first thermal fluid output 32 preferably includes a first fluid output flow sensor 33, a first fluid output pressure sensor 34, and a first fluid output temperature sensor 35. The first thermal fluid output 32 preferably contains within it a thermal fluid 37 generated by the combustion-powered thermal energy source 20 which is preferably one of steam, oil, glycol, or water, but the invention is not so limited.

The system 10 of the first exemplary embodiment also has an electric-powered thermal energy source 40. The electric-powered thermal energy source 40 preferably has a second thermal fluid input 41, an electricity input 46, and a second thermal fluid output 52. The second thermal fluid input 41 preferably has a second thermal fluid flow sensor 42, a second thermal fluid pressure sensor 43, a second thermal fluid temperature sensor 44, and a second makeup thermal fluid source 45. The electricity input 46 preferably includes a power monitor 47. The power monitor 47 is preferably a current transformer, but the invention is not so limited. The second thermal fluid output 52 preferably includes a second fluid output flow sensor 53, a second fluid output pressure sensor 54, and a second fluid output temperature sensor 55. The second thermal fluid output 52 preferably contains within it the thermal fluid 37 as generated by the electric-powered thermal energy source 40. The system 10 of the first exemplary embodiment also preferably includes a thermal fluid distribution system 60. The system 10 of the first exemplary embodiment further preferably includes a controller 15 configured to actuate either or both of the combustion-powered thermal energy source 20 and the electric-powered thermal energy source 40 based at least in part on information received from any of the sensors or other listed components of the system 10, as further described throughout this specification. Each of the sensors described above is preferably configured to continuously collect data.

The system 10 for generating thermal energy from a plurality of different energy sources having both the combustion-powered thermal energy source 20 and the electric-powered thermal energy source 40 is preferably controlled by the controller 15, which can dispatch either or both of the combustion-powered thermal energy source 20 and the electric-powered thermal energy source 40 by determining the optimum combination of the combustion-based thermal output capacity and the electric-based thermal output capacity utilizing the methods detailed herein. The combustion-powered thermal energy source 20 preferably includes at least one combustion heater 29, and more preferably, a series of combustion heaters 29. The combustion-powered thermal energy source 20 is preferably a fossil fuel-based energy source in which fossil fuels are burned to create energy, but the invention is not so limited and may also be used with other combustion sources such as biofuel, biomethane, renewable energy sources, and the like. Each of the combustion heaters 29 preferably has a combustion-based thermal output capacity, and more preferably, several of the individual combustion heaters 29 have differing combustion-based thermal output capacities. The electric-powered thermal energy source 40 preferably includes at least one electric heater 49, and more preferably a series of electric heaters 49. Each of the electric heaters 49 preferably has an electric-based thermal output capacity, and more preferably, several of the individual electric heaters 49 have differing electric-based thermal output capacities. The system 10 also preferably includes the controller 15 configured to calculate a marginal cost of thermal energy and dispatch either or both of the combustion-powered thermal energy source 20 and the electric-powered thermal energy source 40.

Figure 2:
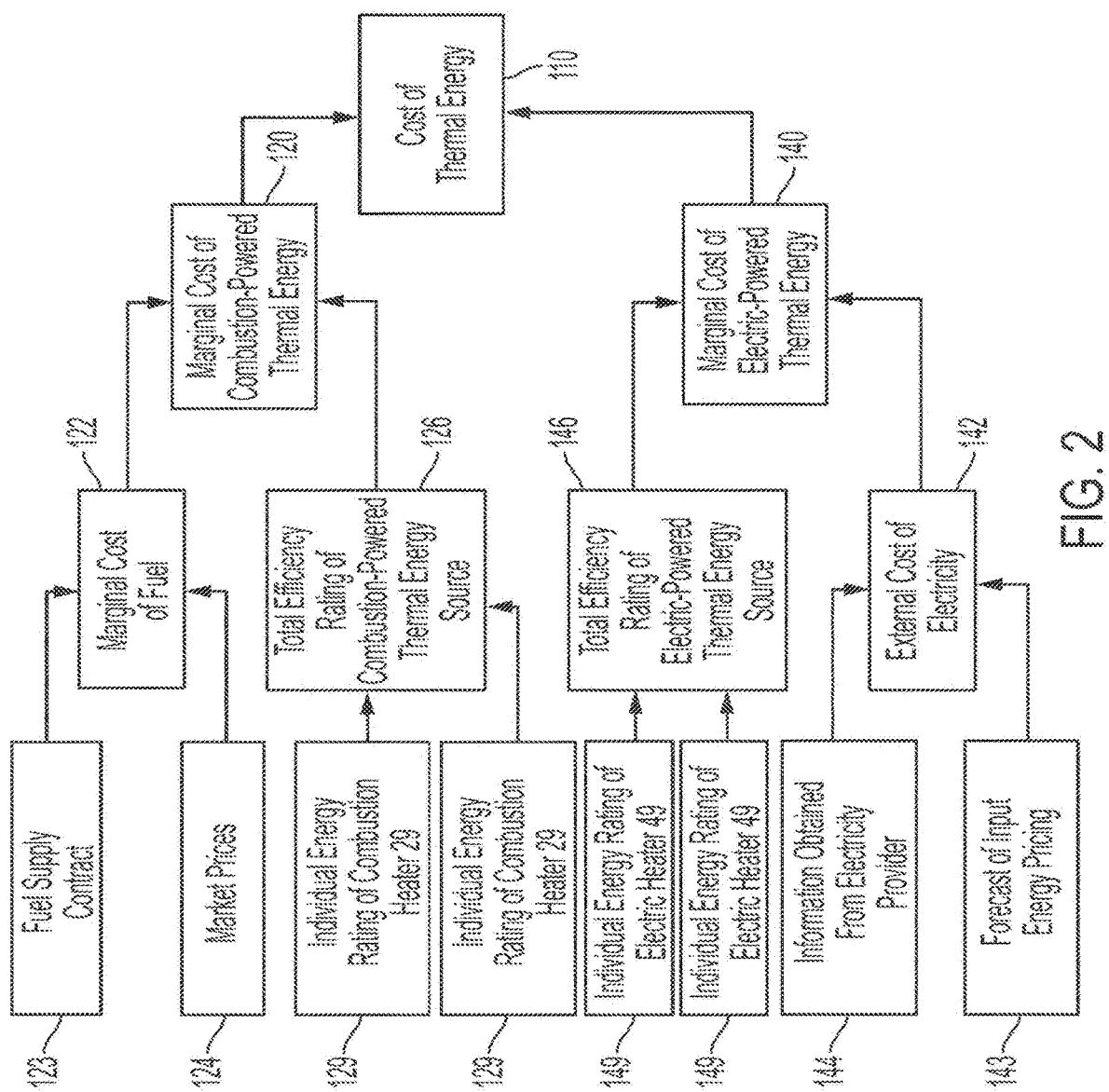
FIG. 2 is a block diagram of a first exemplary method of calculating the marginal cost of thermal energy using the system of FIG. 1.

Referring now to FIG. 2, a block diagram is shown to depict an exemplary method by which the controller 15 can calculate the cost of thermal energy 110 based upon both internal and external data, as described herein. The cost of thermal energy 110 can be calculated based upon a marginal cost of combustion-powered thermal energy 120 and/or the marginal cost of electric-powered thermal energy 140.

The marginal cost of combustion-powered thermal energy 120 is preferably calculated at least in part based upon a marginal cost of fuel 122. The marginal cost of fuel 122 may be determined based upon a fuel supply contract 123 and/or based upon market prices 124. The marginal cost of combustion-powered thermal energy 120 is also preferably calculated at least in part based upon a total efficiency rating 126 of the combustion-powered thermal energy source 20. In turn, the total efficiency rating 126 of the combustion-powered thermal energy source 20 may be determined by calculating a weighted average of an individual efficiency rating 129 associated with each individual combustion heater 29 within the combustion-powered thermal energy source 20. By combining the marginal cost of fuel 122 with the total efficiency rating 126 of the combustion-powered thermal energy source 20, one can determine the marginal cost of combustion-powered thermal energy 120.

The marginal cost of electric-powered thermal energy 140 may be calculated at least in part on the total efficiency rating 146 of the electric-powered thermal energy source 40 and an external cost of electricity 142. The external cost of electricity 142 may be determined based on a forecast of input energy pricing 143 or simply through information obtained from an electricity provider 144. The total efficiency rating 146 of the electric-powered thermal energy source 40 may be determined by calculating a weighted average of the individual efficiency rating 149 associated with each individual electric heater 49 within the electric-powered thermal energy source 40. By combining the external cost of electricity 142 with the total efficiency rating 146 of the electric-powered thermal energy source 40, one can determine the marginal cost of electric-powered thermal energy 140.

In use, the controller 15 can compare the marginal cost of combustion-powered thermal energy 120 with the marginal cost of electric-powered thermal energy 140 and select for use the energy source with the lower marginal cost.

Figure 3:
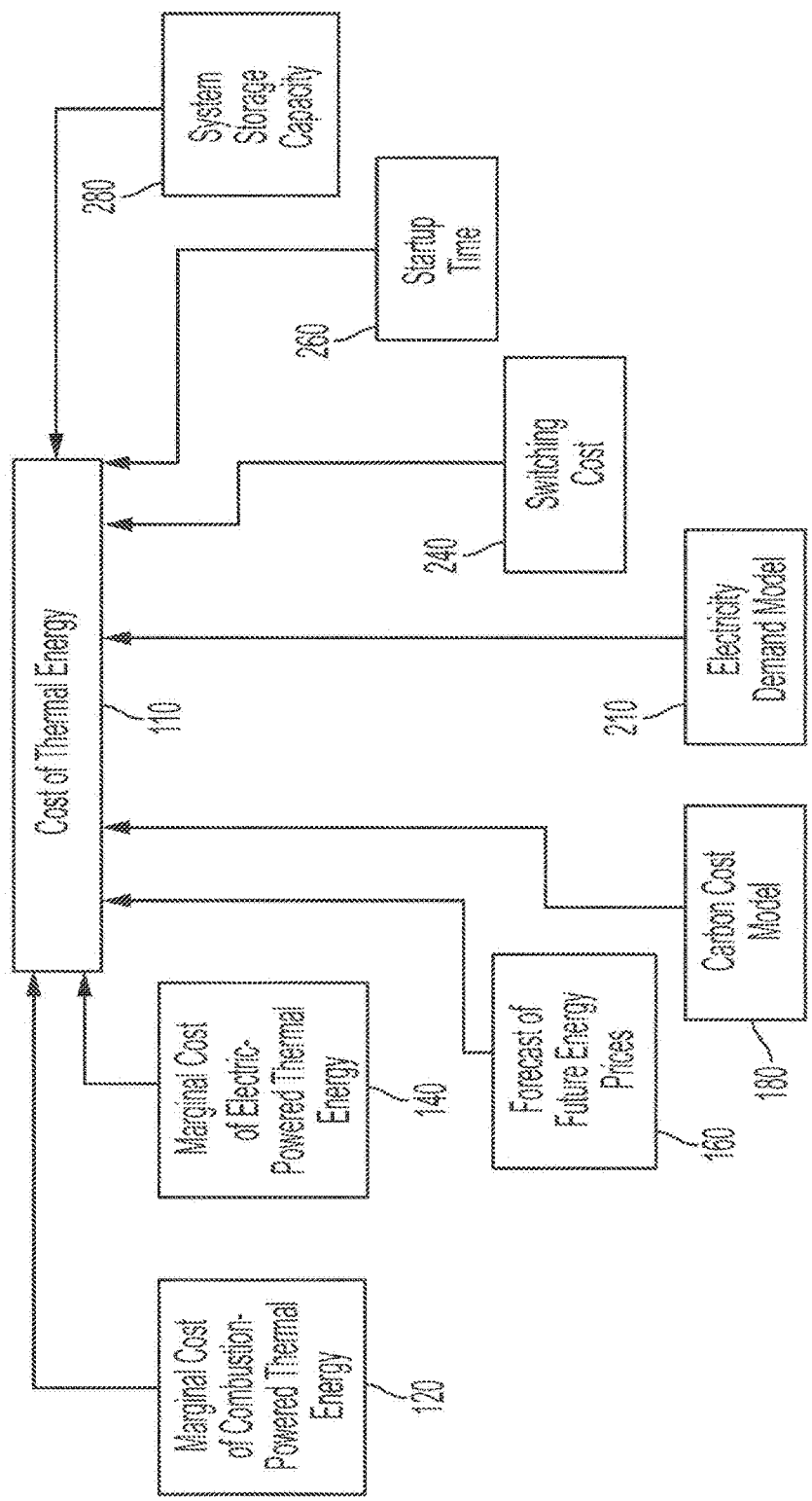
FIG. 3 is a block diagram of a second exemplary method of calculating the marginal cost of thermal energy using the system of FIG. 1.

As shown in FIG. 3, the cost of thermal energy 110 may also be calculated based on a forecast of future energy prices 160, a carbon cost model 180, an electricity demand model 210, a switching cost 240, a startup time 260, and a system storage capacity 280.

Figure 4:
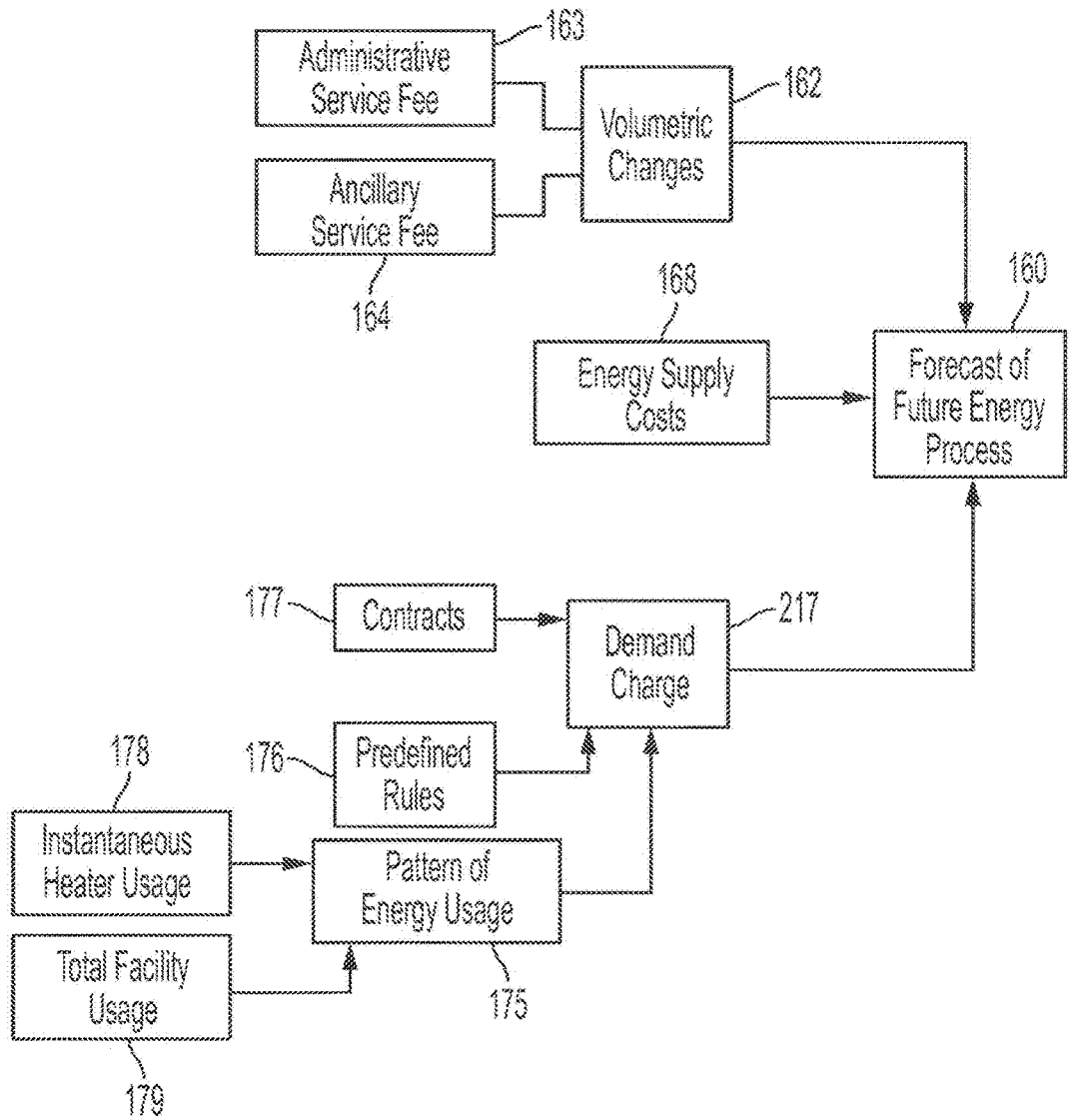
FIG. 4 is a block diagram of an exemplary method of calculating a forecast of future energy prices for use in the method of FIG. 3.

As shown in FIG. 4, the forecast of future energy prices 160 includes a set of non-energy volumetric charges 162, a set of variable energy supply costs 168, and a set of demand charges 217. Volumetric charges 162 are charges that are assessed in proportion to the amount of energy purchased, such as an administrative service fee 163 or ancillary service fee 164 billed per kilowatt-hour of electricity consumed. The volumetric charges 162 may be considered a series of predefined rules, but are not so limited. Energy supply costs 168 are those for the cost of the electrical energy consumed and will generally vary over the course of minutes or hours. Demand charges 217 are charges billed in proportion to the highest level of power draw during a billing period. Demand charges 217 may only consider power draw coincident with certain periods or may be based upon non-coincident power draw. Demand charges may also take other forms, such as tiered pricing or charges for consuming more or less energy than a specified consumption range over a given period. The demand charge 217 can therefore include a pattern of energy usage 175 and a series of predefined rules 176 or contracts 177. The pattern of energy usage 175 preferably includes an instantaneous heater usage 178 and a total facility usage 179, each of which are used to show characteristics of the amounts of energy used over time by a given source of energy.

Figure 5:
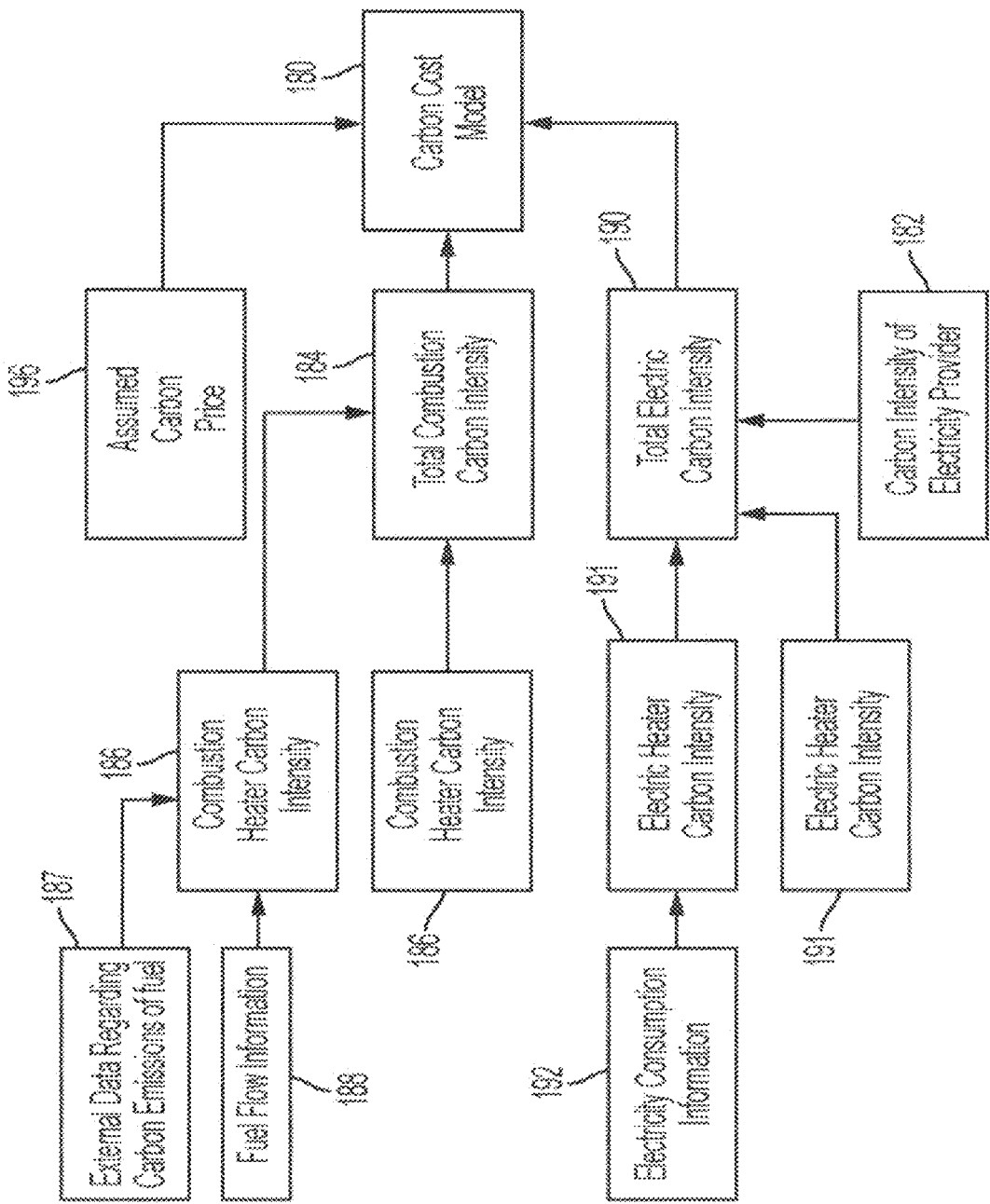
FIG. 5 is a block diagram of an exemplary method of calculating a carbon cost model for use in the method of FIG. 3.

As shown in FIG. 5, a desire to reduce carbon emissions can be achieved by equating carbon emissions to the carbon cost model 180. The carbon cost model 180 preferably includes a combustion heater carbon intensity 186 of each combustion heater 29 and an electric heater carbon intensity 191 of each electric heater 49. The combustion heater carbon intensity 186 of each combustion heater 29 can be summed into a total combustion carbon intensity 184 of the combustion-powered thermal energy source 20 and the electric heater carbon intensity 191 of each electric heater 49 can be summed into a total electric carbon intensity 190 of the electric-powered thermal energy source 40. The total electric carbon intensity 190 can also include a carbon intensity of an electricity provider 182 to factor in carbon costs associated with the supplier of the electricity that powers the electric-powered thermal energy source 40. The combustion heater carbon intensity 186 of each combustion heater 29 can be determined based upon external data regarding carbon emissions of the fuel 187 as well as based on fuel flow information 188 obtained from the fuel flow sensor 27 to determine how much of the fuel 28 is consumed. Similarly, the electric heater carbon intensity 191 can be determined based on electricity consumption information 192 obtained from the power monitor 47. The carbon cost model 180 preferably also includes an assumed carbon price 196.

Figure 6:
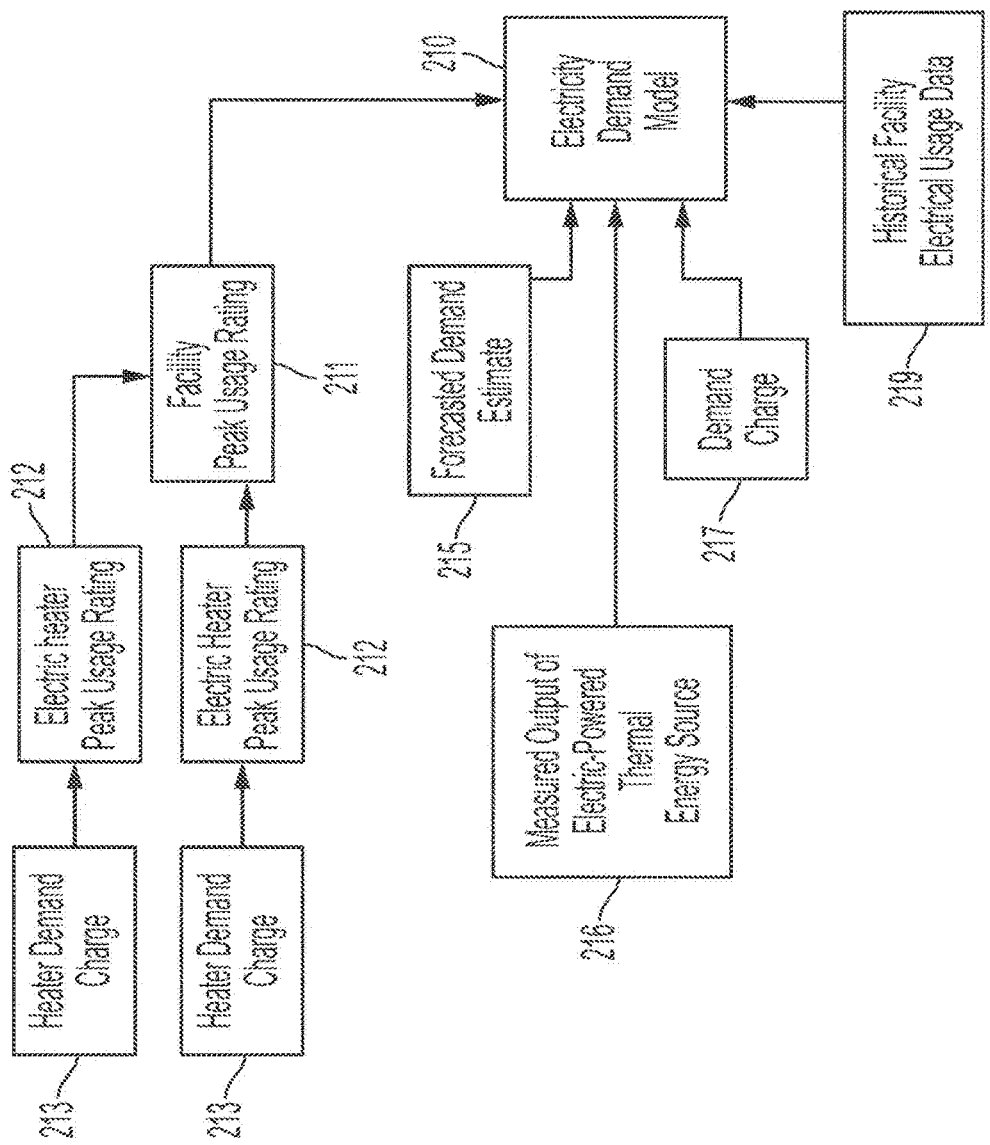
FIG. 6 is a block diagram of an exemplary method of creating an electricity demand model for use in the method of FIG. 3.
Figure 7:
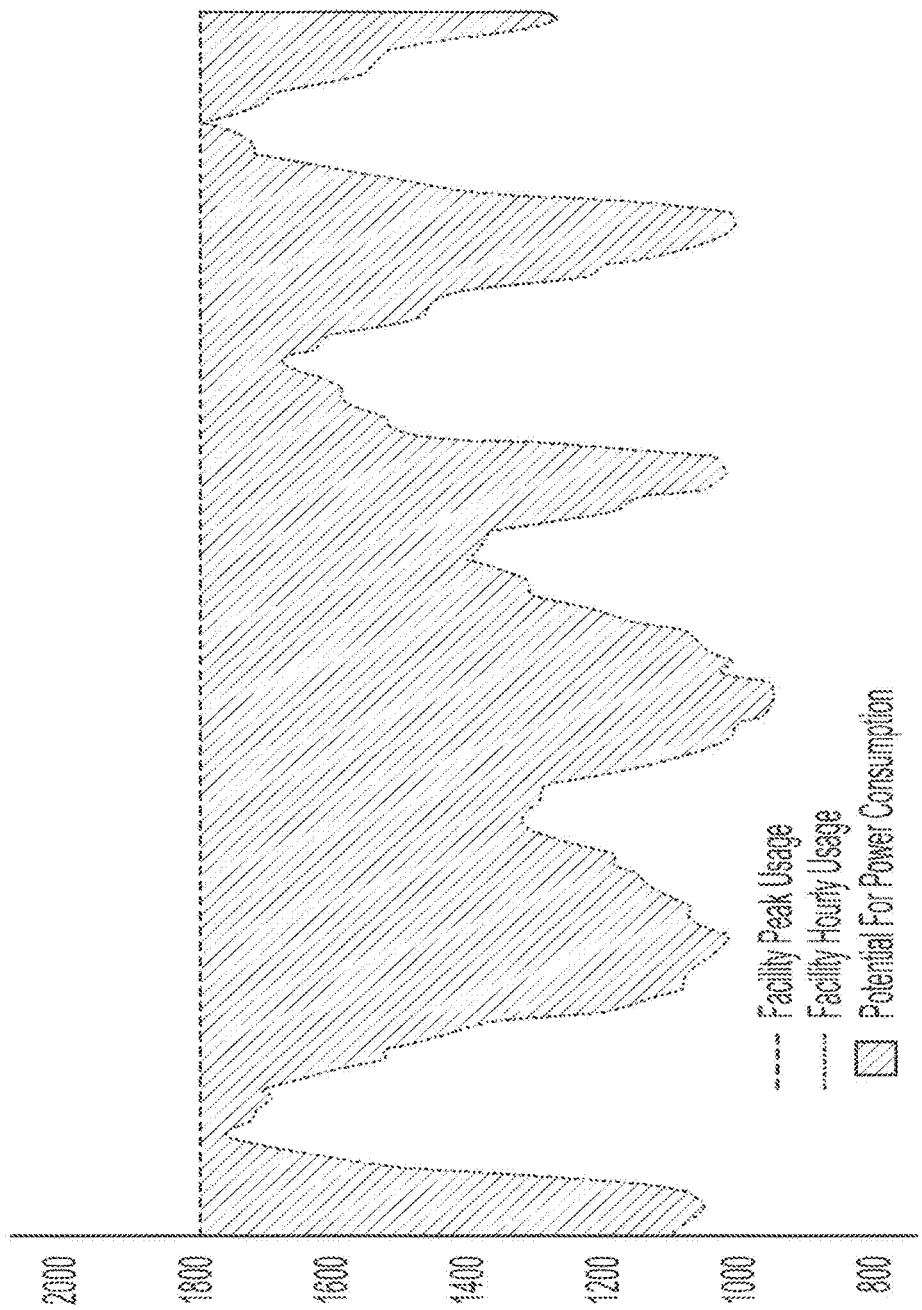
FIG. 7 is a line graph depicting an exemplary electricity demand forecast for use in the method of FIG. 6.

As shown in FIG. 6, the electricity demand model 210 is a computer model in which demand for electricity can be simulated, predicted, or estimated and preferably includes a facility peak usage rating 211, a forecasted demand estimate 215, and a demand charge 217. The electricity demand model 210 also preferably includes historical facility electricity usage data 219. In the power generation industry, the demand charge 217 is typically calculated on a monthly basis by determining the highest level of electricity consumed from each energy source by a consumer at any given time over the previous month. A fixed cost is then added to the consumer's electricity bill based on the highest level of demand in the prior month, with the fixed charge being proportional to the highest level of demand. Thus, it is desirable to avoid high peaks of energy consumption in order to lower one's demand charge 217. Therefore, the controller 15 is preferably configured to monitor a measured output 216 of the electric-powered thermal energy source 40 at any given time. By comparing the measured output 216 of the electric-powered thermal energy source 40 at a given time to a facility peak electricity usage rating 211, the controller 15 can determine whether an increase in consumption by the electric-powered thermal energy source 40 will increase the facility's demand charge 217 in subsequent billing periods. An exemplary comparison of this nature is shown in FIG. 7.

Referring again to FIG. 6, in response to increased demand, the controller 15 can be configured to dispatch the combustion-powered thermal energy source 20 in situations where the measured output 216 of the electric-powered energy source is at, within a percentage of, or above the facility peak electricity usage rating 211, in order to avoid increasing the demand charge 217. This percentage is determined by algorithmic weighting of confidence of the consumption forecasts and the asymmetric costs of incurring a demand charge and benefits of producing thermal energy using the electric-powered thermal energy source 40. Alternately, where the measured output 216 of the electric-powered thermal energy source 40 is significantly below the facility peak electricity usage rating 211, for example at night when demand is often 50% below the facility peak electricity usage rating 211, the controller 15 can be configured to dispatch the electric-powered thermal energy source 40 because it will not trigger an increase in the demand charge 217. In these situations, the excess energy may be stored by the system as described elsewhere in this specification. In yet a third situation, the consumer may determine the demand charge 217 at a given time is relatively inexpensive, and the controller 15 can be configured to dispatch the electric-powered thermal energy source 40 even if the measured output 216 of the electric-powered energy source is at, within a predetermined percentage of, or above the facility peak electricity usage rating 211. In a fourth exemplary situation, the measured output 216 may be well below the facility peak electricity usage rating 211, but the electricity demand model 210 may include the forecasted demand estimate 215 suggesting that the measured output 216 is expected to rise in the near future to at or near the facility peak electricity usage rating 211. In this situation, the controller 15 can be configured to dispatch the combustion-powered thermal energy source 20 in order to avoid increasing the demand charge 217 based on the anticipated increase in the measured output 216.

In a system having multiple electric heaters 49, the facility peak usage rating 211 preferably further includes a plurality of electric heater peak usage ratings 212, each electric heater peak usage rating 212 being associated with one of the electric heaters 49. In this way, the decision by the controller 15 over which energy source is actuated can be determined more granularly, by turning on and off individual electric heaters 49 based upon a heater demand charge 213 associated with each electric heater 49.

Figure 8:
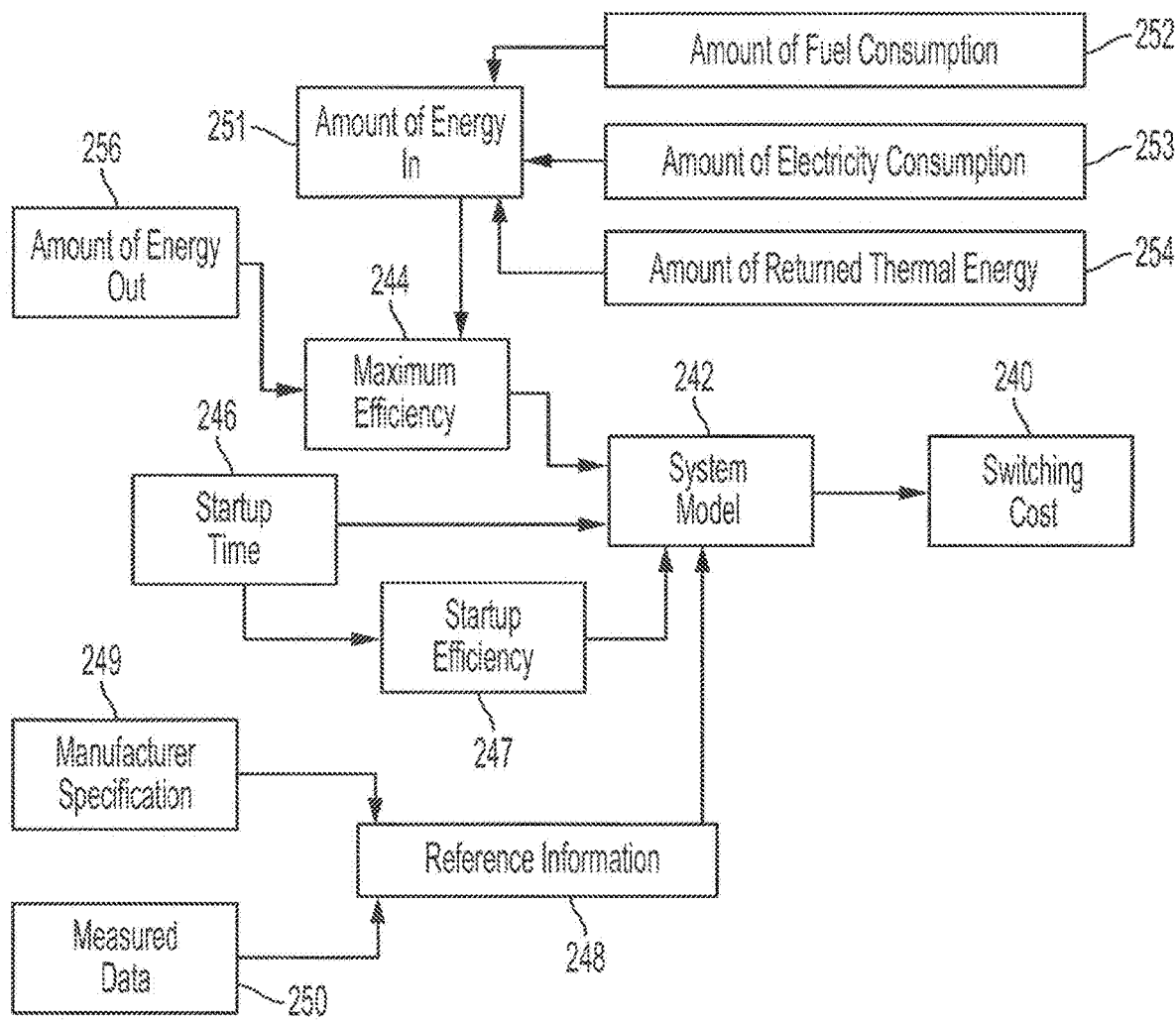
FIG. 8 is a block diagram of an exemplary method of calculating a switching cost for use in the method of FIG. 3.

As shown in FIG. 8, the switching cost 240 is preferably calculated based upon a system model 242, which in turn preferably includes a maximum efficiency 244 and a startup time 246. In use, many sources of thermal energy cannot be immediately activated at maximum efficiency. Instead, the startup time 246 defines a period of time after activation of the energy source before the energy source reaches its maximum efficiency. During this period of time, the energy source may only operate at a reduced efficiency, or may scale from a minimum efficiency rating up to the maximum efficiency at the end of the startup time 246. By summing up the energy source's efficiency over the period of the startup time 246, a startup efficiency 247 can be determined. The startup efficiency 247 defines the amount of energy the energy source can produce during the startup time 246. The maximum efficiency 244, startup time 246, and startup efficiency 247 in the system model 242 can be determined from historical data measured by the sensors described above, by reference to a reference information 248 regarding a comparable energy generation system, or both. When referencing a comparable energy generation system, the system model 242 can incorporate data such as the manufacturer specification 249 of the comparable energy generation system and measured data 250 from comparable energy generation systems, including data regarding how those other energy generation systems have been operated and over what period of time. The switching cost 240 can be used in conjunction with the forecast of future energy prices 160 in order for the controller 15 to determine whether the system 10 should switch to a different energy source. Because of the energy lost during the startup time 246, in many situations it is not economical to switch energy sources unless the expected savings from utilizing the different energy source outweigh the switching cost 240. The controller 15 can use the forecast of future energy prices 160 to determine whether the future costs of the different energy source are expected to remain low in comparison to the switching cost 240.

The system model 242 may also include an amount of energy in 251 and an amount of energy out 256. A comparison of the amount of energy in 251 to the amount of energy out 256 determines the maximum efficiency 244 of an individual combustion heater 29 or an individual electric heater 49, as well as the maximum efficiency 244 of the combustion-powered thermal energy source 20 or electric-powered thermal energy source 40. The amount of energy in 251 is preferably determined based on any combination of three sources: a detected amount of fuel consumption 252, as measured by the fuel flow sensor 27; a detected amount of electricity consumption 253, as measured by the power monitor 47; and a calculated amount of returned thermal energy 254, such as the remaining heat in a previously-heated fluid 37 found in one or more thermal energy stores 310, each of which has a storage capacity. The calculated amount of returned thermal energy 254 is preferably calculated through information obtained from one or more of the thermal fluid temperature sensor 24, 44, the thermal fluid pressure sensor 23, 43, and the thermal fluid flow sensor 22, 42, allowing the system model 242 to determine how much fluid 37 is running into the combustion-powered thermal energy source 20 and electric-powered thermal energy source 40 and how much energy is found in the fluid 37, based on its temperature and pressure.

The amount of energy out 256 is preferably determined based on information obtained from one or more of the thermal fluid flow sensor 33 or electric heater steam flow sensor 53, the thermal fluid temperature sensor 35 or electric heater steam temperature sensor 55, and the thermal fluid pressure sensor 34 or electric heater steam pressure sensor 54. Based upon all the data obtained from the sensors described herein, the system model 242 can be continually refined and improved over time to optimize energy production and the cost of thermal energy 110.

Figure 9:
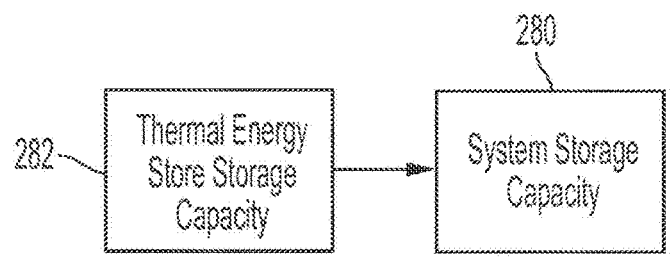
FIG. 9 is a block diagram of an exemplary method of calculating a system storage capacity for use in the method of FIG. 3.
Figure 10:
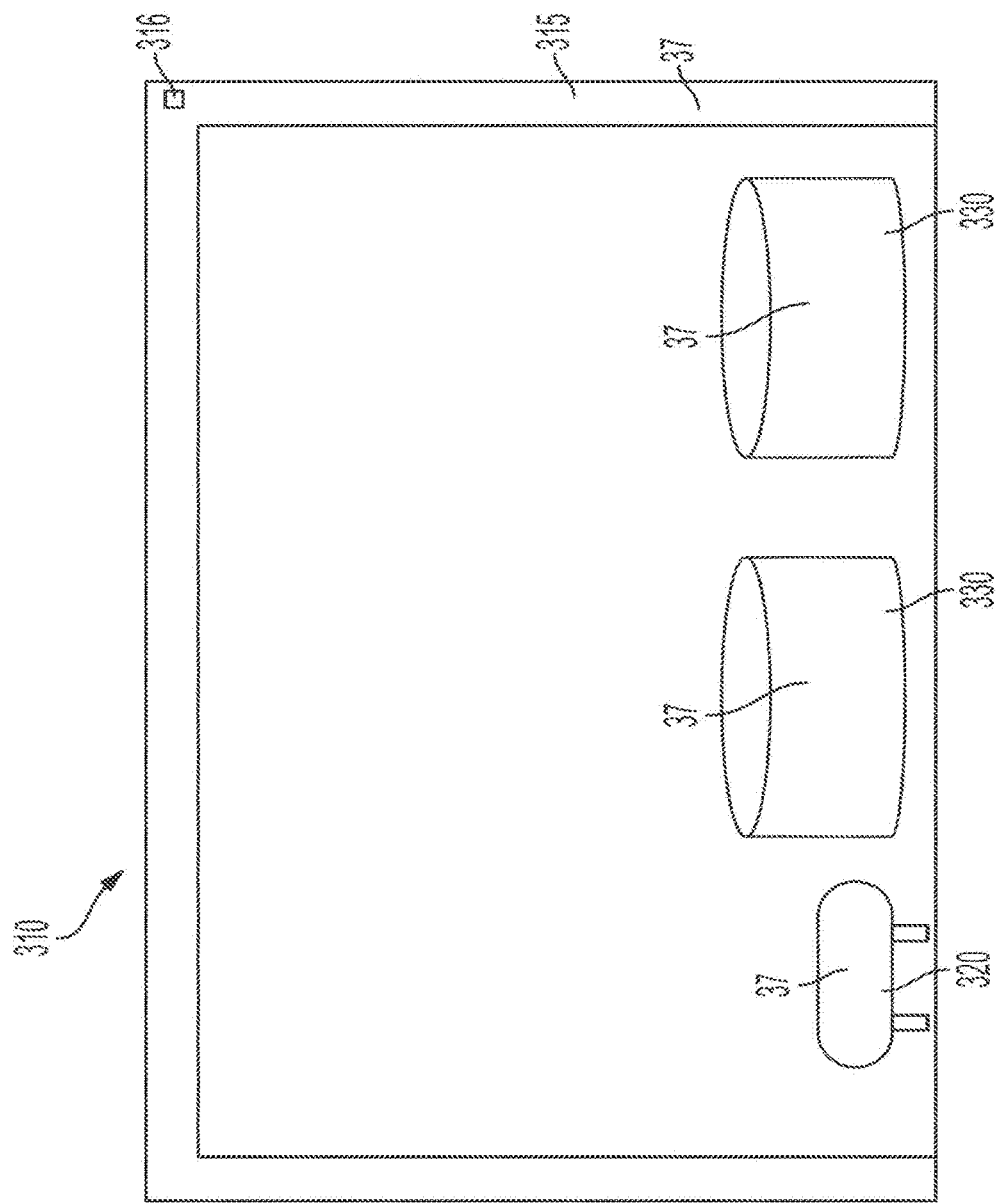
FIG. 10 is a front elevational view of a thermal energy generation system in accordance with a second exemplary embodiment of the invention.

In many environments, it may be more efficient or cost effective to store thermal energy rather than to store electricity. In these environments, the present invention may be utilized to overproduce thermal energy during periods of low or even negative cost to store that energy as thermal energy based on the system storage capacity 280. As shown in FIGS. 9 and 10, the system storage capacity 280 is preferably determined based on a storage capacity 282 of a thermal energy store 310. The system storage capacity 282 is a property of one or more thermal energy stores 310, each of which has a storage capacity of its own. The thermal energy stores 310 are preferably thermal batteries, more preferably steam accumulators 320, but are not so limited and may be any type of device suitable for storing thermal energy. The thermal energy stores 310 may also be a heat distribution system, a heat transfer fluid, or a heated medium such as a building envelope 315.

The system storage capacity 280 can be further calculated based on information measured by the thermal fluid temperature sensor 35 or electric heater steam temperature sensor 55, the thermal fluid pressure sensor 34 or electric heater steam pressure sensor 54, and a building envelope temperature sensor 316. In this exemplary embodiment, energy can be stored in any contained fluid 37, such as air in a building or a liquid stored in a container or vat 330. The fluid 37 can be heated to a predetermined maximum temperature, allowing energy to be stored as heat within the fluid 37. In one exemplary method, where the cost of thermal energy 110 is low, the controller 15 can be configured to activate one or more of the combustion-powered thermal energy source 20 and/or the electric-powered thermal energy source 40 to continually heat the fluid 37 to capitalize on the low cost of thermal energy 110 and store thermal energy within the fluid 37 so that it may be used at a later time, when the cost of thermal energy 110 may be higher. In another exemplary method, the controller 115 can be configured to increase the pressure of the fluid 37 based on information obtained from the thermal fluid pressure sensor 34 or electric heater steam pressure sensor 54, thereby increasing the system storage capacity 280.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A thermal energy system comprising:
    a thermal energy store;
    a thermal fluid distribution system in fluid communication with the thermal energy store;
    a thermal energy source having a thermal fluid input and a thermal fluid output and being configured to receive thermal fluid via the thermal fluid input, heat the thermal fluid, and output the thermal fluid via the thermal fluid output toward the thermal fluid distribution system;
a controller in communication with the thermal fluid distribution system and the thermal energy source, the controller being configured to:
determine a cost of thermal energy based at least on a forecast of future energy prices; and
activate the thermal energy source to cause the thermal energy source to heat the thermal fluid and overproduce thermal energy for storage in the thermal energy store based on the determined cost of thermal energy.

2. The thermal energy system of claim 1, wherein the controller is configured to continually heat the thermal fluid based on the determined cost of thermal energy.

3. The thermal energy system of claim 2, further comprising a temperature sensor, and wherein the controller is configured to heat the thermal fluid to a maximum temperature.

4. The thermal energy system of claim 1, wherein thermal energy provided to the thermal fluid is stored in the thermal energy store.

5. The thermal energy system of claim 4, wherein the thermal energy store comprises a steam accumulator.

6. The thermal energy system of claim 4, wherein the thermal energy store comprises a container or vat.

7. The thermal energy system of claim 1, wherein the thermal energy source is configured such that receiving the thermal fluid comprises receiving water and the outputting the thermal fluid comprises outputting steam.

8. The thermal energy system of claim 1, wherein the thermal energy source comprises a combustion-powered thermal energy source and further comprising an electric-powered thermal energy source configured to receive a second thermal fluid, heat the second thermal fluid received by the electric-powered thermal energy source, and output the second thermal fluid to the thermal fluid distribution system.

9. The thermal energy system of claim 8, wherein thermal fluid received by the combustion-powered thermal energy source and the second thermal fluid received by the electric-powered thermal energy source are water.

10. The thermal energy system of claim 8, wherein the controller is configured to calculate marginal cost of thermal energy and dispatch either or both of the combustion-powered thermal energy source and the electric-powered thermal energy source.

11. The thermal energy system of claim 8, wherein:
the combustion-powered thermal energy source has at least one combustion heater, each combustion heater having a combustion-based thermal output capacity;
the electric-powered thermal energy source has at least one electric heater, each electric heater having an electric-based thermal output capacity; and
the controller is configured to dispatch either or both of the combustion-powered thermal energy source and the electric-powered thermal energy source by determining an optimum combination of the combustion-based thermal output capacity and the electric-based thermal output capacity.

12. The thermal energy system of claim 11, further comprising:
a first thermal fluid temperature sensor configured to sense a temperature of the thermal fluid received by the combustion-powered thermal energy source;
a second thermal fluid temperature sensor configured to sense a temperature of the thermal fluid received by the electric-powered thermal energy source;
a third thermal fluid temperature sensor configured to sense a temperature of the thermal fluid output from the combustion-powered thermal energy source;
a fourth thermal fluid temperature sensor configured to sense a temperature of the thermal fluid output from the electric-powered thermal energy source;
a first thermal fluid pressure sensor configured to sense a pressure of the thermal fluid received by the combustion-powered thermal energy source;
a second thermal fluid pressure sensor configured to sense a pressure of the thermal fluid received by the electric-powered thermal energy source;
a third thermal fluid pressure sensor configured to sense a pressure of the thermal fluid output from the combustion-powered thermal energy source; and
a fourth thermal fluid pressure sensor configured to sense a pressure of the thermal fluid output from the electric-powered thermal energy source.

13. The thermal energy system of claim 1, wherein the thermal energy source is configured to receive previously-heated thermal fluid from the thermal energy store.

14. The thermal energy system of claim 13, further comprising one or more sensors in communication with the controller and configured to provide information to the controller regarding thermal fluid input to the thermal energy source.

15. The thermal energy system of claim 14, wherein
the one or more sensors comprises a thermal fluid temperature sensor, a thermal fluid pressure sensor, and a thermal fluid flow sensor; and
the controller is configured to calculate an amount of returned thermal energy from the previously-heated fluid from the thermal energy store using the information received from the one or more sensors.

16. The thermal energy system of claim 1, further comprising one or more sensors in communication with the controller and configured to provide information to the controller regarding thermal fluid output from the thermal energy source.

17. The thermal energy system of claim 16, wherein the one or more sensors comprises an output fluid temperature sensor and an output fluid pressure sensor.

18. The thermal energy system of claim 17, wherein the controller is configured to calculate a system storage capacity, wherein the system storage capacity is based on a storage capacity of the thermal energy store.

19. The thermal energy system of claim 18, wherein the controller is configured to receive information from the pressure sensor and increase the pressure of the thermal fluid based on the information received from the pressure sensor to increase the system storage capacity.

20. The thermal energy system of claim 18, wherein the controller is further configured to activate the thermal energy source to cause the thermal energy source to heat the thermal fluid based on the calculated system storage capacity.

* * * * *